(12) United States Patent
Wang et al.

(10) Patent No.: US 10,302,831 B2
(45) Date of Patent: May 28, 2019

(54) WIRE GRID POLARIZER WITH HIGH REFLECTIVITY ON BOTH SIDES

(71) Applicant: Moxtek, Inc., Orem, UT (US)

(72) Inventors: Bin Wang, Sandy, UT (US); Shaun Ogden, Saratoga Springs, UT (US); R. Stewart Nielson, Pleasant Grove, UT (US); Hua Li, Sandy, UT (US); Brian Bowers, Kaysville, UT (US)

(73) Assignee: Moxtek, Inc., Orem, UT (US)

( * ) Notice: Subject to any disclaimer, the term of this patent is extended or adjusted under 35 U.S.C. 154(b) by 0 days.

(21) Appl. No.: 16/163,194

(22) Filed: Oct. 17, 2018

(65) Prior Publication Data

US 2019/0049645 A1 Feb. 14, 2019

Related U.S. Application Data

(62) Division of application No. 15/715,435, filed on Sep. 26, 2017, now Pat. No. 10,139,538.

(60) Provisional application No. 62/433,619, filed on Dec. 13, 2016, provisional application No. 62/425,201, filed on Nov. 22, 2016.

(51) Int. Cl.
*G02B 5/30* (2006.01)
*G02B 27/28* (2006.01)
*G02B 5/04* (2006.01)
*G02B 1/14* (2015.01)

(52) U.S. Cl.
CPC .......... *G02B 5/3058* (2013.01); *G02B 5/045* (2013.01); *G02B 5/3075* (2013.01); *G02B 27/283* (2013.01); *G02B 1/14* (2015.01)

(58) Field of Classification Search
CPC ... G02B 5/3058; G02B 5/3075; G02B 27/283
USPC .................. 359/352, 485.05, 489.08, 489.09
See application file for complete search history.

(56) References Cited

U.S. PATENT DOCUMENTS

| | | | |
|---|---|---|---|
| 6,447,120 B1 | 9/2002 | Hansen et al. | |
| 6,585,378 B2 | 7/2003 | Kurtz et al. | |
| 6,665,119 B1 | 12/2003 | Kurtz et al. | |
| 7,813,039 B2 * | 10/2010 | Perkins ............... | G02B 5/3058 359/485.05 |
| 7,961,393 B2 | 6/2011 | Perkins et al. | |
| 8,755,113 B2 | 6/2014 | Gardner et al. | |
| 9,632,224 B2 | 4/2017 | Nielson et al. | |
| 10,139,538 B2 * | 11/2018 | Wang ..................... | G02B 5/045 |
| 2002/0122235 A1 | 9/2002 | Kurtz et al. | |
| 2004/0120041 A1 | 6/2004 | Silverstein et al. | |
| 2006/0185983 A1 | 8/2006 | Kumai et al. | |
| 2007/0296921 A1 | 12/2007 | Wang et al. | |
| 2008/0316599 A1 | 12/2008 | Wang et al. | |

(Continued)

*Primary Examiner* — Ricky D Shafer
(74) *Attorney, Agent, or Firm* — Thorpe, North & Western, LLP

(57) ABSTRACT

A wire grid polarizer (WGP) 10 can include a reflective layer 15 sandwiched on each side by a pair of transparent layers (11-12 and 13-14). An index of refraction of each outer transparent layer 11 or 14 can be greater than an index of refraction of the adjacent inner transparent layer 12 or 13, respectively. Material composition of the outer transparent layers 11 and 14 can be the same, material composition of the adjacent inner transparent layers 12 and 13 can be the same. There can be high reflection of one polarization (e.g. Rs1>93% and Rs2>93%) for light incident on either side of the WGP.

20 Claims, 4 Drawing Sheets

(56) References Cited

U.S. PATENT DOCUMENTS

| | | |
|---|---|---|
| 2014/0313571 A1 | 10/2014 | Gardner et al. |
| 2015/0062500 A1 | 3/2015 | Park et al. |
| 2016/0231487 A1 | 8/2016 | Wangensteen et al. |
| 2017/0139095 A1 | 5/2017 | Nielson et al. |
| 2018/0052270 A1 | 2/2018 | Nielson et al. |
| 2018/0143364 A1 | 5/2018 | Wang et al. |
| 2018/0143365 A1 | 5/2018 | Nielson et al. |
| 2018/0143366 A1 | 5/2018 | Wang et al. |

* cited by examiner

WIRE GRID POLARIZER WITH HIGH REFLECTIVITY ON BOTH SIDES

CLAIM OF PRIORITY

This application is a divisional of U.S. Non-provisional patent application Ser. No. 15/715,435, filed on Sep. 26, 2017, which claims priority to U.S. Provisional Patent Application Nos. 62/425,201, filed on Nov. 22, 2016, and 62/433,619, filed on Dec. 13, 2016, which are incorporated herein by reference.

FIELD OF THE INVENTION

The present application is related generally to wire grid polarizers.

BACKGROUND

A wire grid polarizer (WGP) can transmit one polarization (e.g. p-polarization) and reflect or absorb an opposite polarization (e.g. s-polarization). High reflectivity of the opposite polarization (e.g. high Rs) can be important because some applications use both polarized light beams (e.g. s & p). High absorption/low reflectivity of the opposite polarization (e.g. low Rs) can be important in some applications because in some applications reflection of this polarization (Rs) can interfere with the optical system. For example, the reflected s-polarization can cause ghosting in an image projector. Some WGPs are designed for high reflection and others for high absorption of the s-polarization.

High transmission of one polarization (e.g. high Tp) can be an important feature of WGPs in order to minimize light-source power requirements. Low transmission of the opposite polarization (e.g. Ts) can be important for improved light image resolution. The quality or performance of WGPs can be shown by efficiency (Tp*Rs) and contrast (Tp/Ts).

SUMMARY

The present invention is directed to various embodiments of a wire grid polarizer (WGP) with high reflection of one polarization (e.g. s-polarization) on two opposite sides of the WGP. The WGP can comprise a transparent substrate having a first side, and a second side opposite of the first side. An array of wires can be located over the first side of the transparent substrate with channels between adjacent wires. Each of the wires can include a stack of layers comprising the following layers in the following order: a first transparent layer located closest to the transparent substrate; a second transparent layer; a reflective layer; a third transparent layer; and a fourth transparent layer located farthest from the transparent substrate.

In one embodiment, an index of refraction of the first transparent layer (n1) can be greater than an index of refraction of the second transparent layer (n2) and an index of refraction of the fourth transparent layer (n4) can be greater than an index of refraction of the third transparent layer (n3).

In another embodiment, a material composition of the first transparent layer can be the same as a material composition of the fourth transparent layer and a material composition of the second transparent layer can be the same as a material composition of the third transparent layer, but different from the material composition of the first transparent layer and the fourth transparent layer.

In another embodiment, Rs1>93% and Rs2>93%, where Rs1 is a percent reflection of s-polarized light from the first side of the WGP; Rs2 is a percent reflection of s-polarized light from the second side of the WGP; s-polarized light is a predominantly reflected polarization of incident light; a first side of the WGP is a side of the WGP on which the array of wires is located; and a second side of the WGP is opposite of the first side of the WGP and is a side of the WGP on which the transparent substrate is located.

BRIEF DESCRIPTION OF THE DRAWINGS (Drawings Might not be Drawn to Scale)

FIG. 1 is a schematic, cross-sectional side-view of a wire grid polarizer 10 (WGP) comprising an array of wires 16 located over a transparent substrate 17, each of the wires 16 including a stack of layers comprising the following layers in the following order: a first transparent layer 11 located closest to the transparent substrate 17, a second transparent layer 12, a reflective layer 15, a third transparent layer 13, and a fourth transparent layer 14 located farthest from the transparent substrate 17, in accordance with an embodiment of the present invention.

DEFINITIONS

Figure 1:
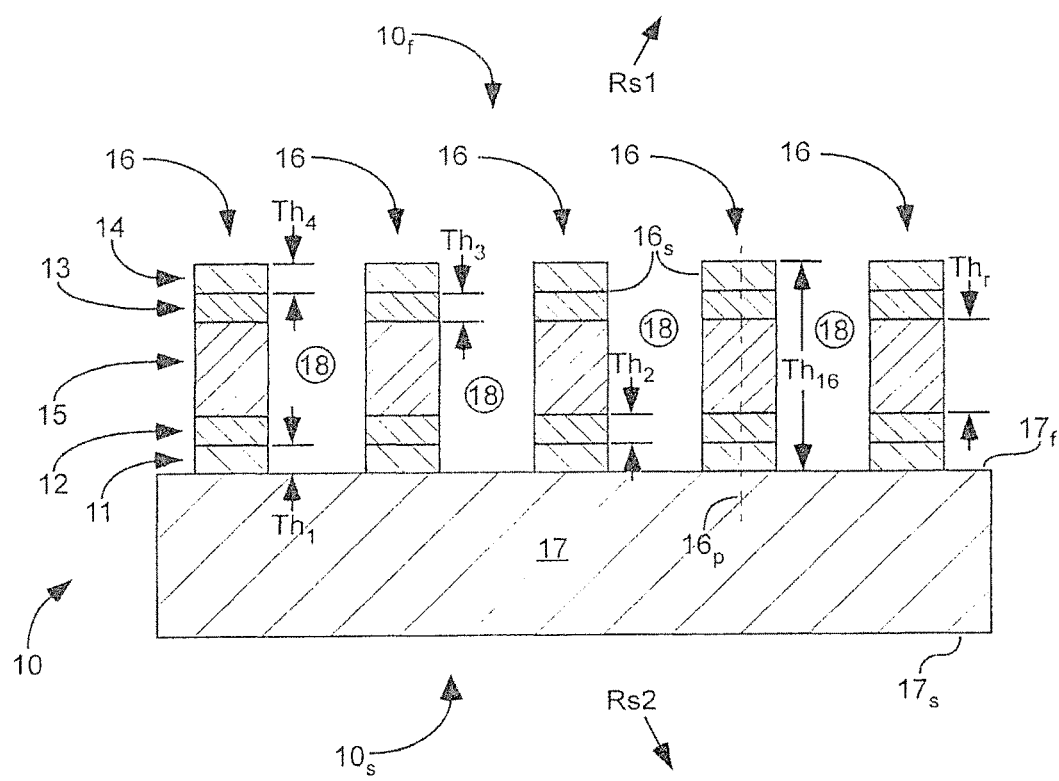

As used herein, the term "elongated" means that a length L of the wires 16 is substantially greater than wire width W or wire thickness $Th_{16}$ (e.g. L can be at least 10 times, at least 100 times, at least 1000 times, or at least 10,000 times larger than wire width W and/or wire thickness $Th_{16}$).

As used herein, the term "equal reflection" means exactly equal reflection, or nearly equal reflection, such that any deviation from exactly equal reflection would have negligible effect for ordinary use of the device.

As used herein, the term "light" can mean light or electromagnetic radiation in the x-ray, ultraviolet, visible, and/or infrared, or other regions of the electromagnetic spectrum.

As used herein, the terms "on", "located on", "located at", and "located over" mean located directly on or located over with some other material between. The terms "located directly on", "adjoin", "adjoins", and "adjoining" mean direct and immediate contact with no other solid material between.

As used herein, the terms "located closest to" and "located farthest from" refer to the materials, layers, or structures mentioned, but there may be other solid material not mentioned that is located closer to or farther from.

As used herein, the term "nm" means nanometer(s).

As used herein, the term "parallel" means exactly parallel, parallel within normal manufacturing tolerances, or nearly parallel, such that any deviation from exactly parallel would have negligible effect for ordinary use of the device.

As used herein, the term "substrate" includes a base material, such as for example a glass wafer. The term "substrate" includes a single material, and also includes multiple materials, such as for example a glass wafer with at least one thin film on a surface of the wafer used together as the base material.

Materials used in optical structures can absorb some light, reflect some light, and transmit some light. The following definitions distinguish between materials that are primarily absorptive, primarily reflective, or primarily transparent. Each material can be considered to be absorptive, reflective, or transparent in a specific wavelength range (e.g. ultraviolet, visible, or infrared spectrum) and can have a different property in a different wavelength range. Such materials are divided into absorptive, reflective, and transparent based on reflectance R, the real part of the refractive index n, and the imaginary part of the refractive index/extinction coefficient k. Equation 1 is used to determine the reflectance R of the interface between air and a uniform slab of the material at normal incidence:

$$R = \frac{(n-1)^2 + k^2}{(n+1)^2 + k^2}$$ Equation 1

Unless explicitly specified otherwise herein, materials with $k \leq 0.1$ in the specified wavelength range are "transparent" materials, materials with $k > 0.1$ and $R \leq 0.6$ in the specified wavelength range are "absorptive" materials, and materials with $k > 0.1$ and $R > 0.6$ in the specified wavelength range are "reflective" materials.

DETAILED DESCRIPTION

Figure 2:
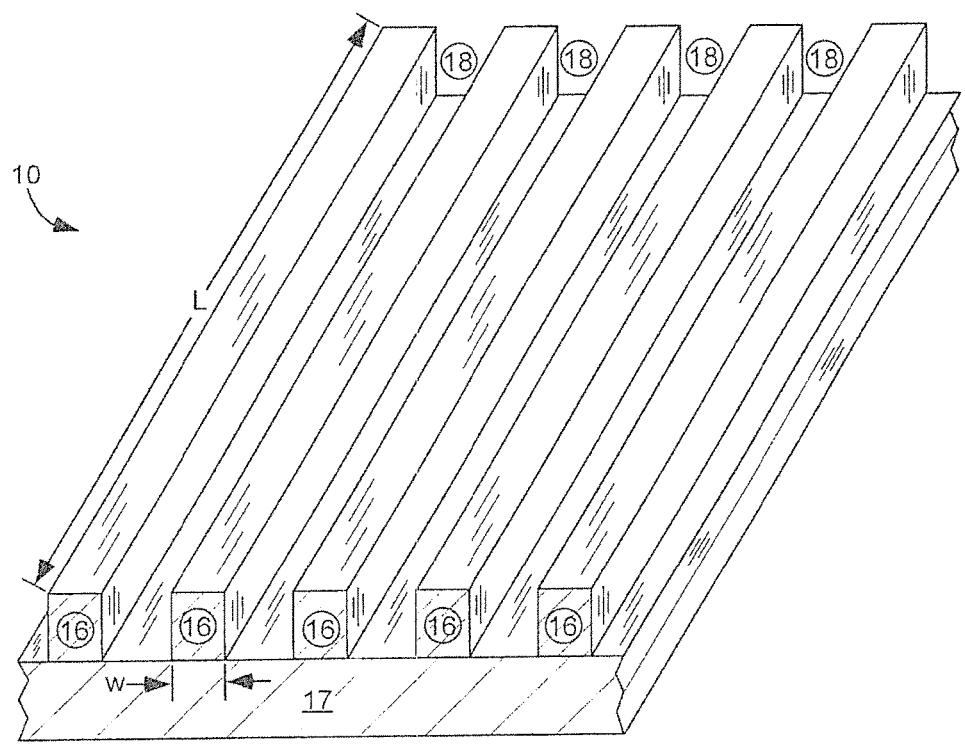
FIG. 2 is a schematic perspective-view of WGP 10, in accordance with an embodiment of the present invention.

As illustrated in FIG. 1, a wire grid polarizer 10 (WGP) is shown comprising a transparent substrate 17 having a first side $17_f$, and a second side $17_s$ opposite of the first side $17_f$. An array of wires 16 (with a length L, shown in FIG. 2, extending into the sheet of FIG. 1) can be located over, or can be located directly on, the first side $17_f$ of the transparent substrate 17 with channels 18 between adjacent wires 16. The array of wires 16 can be parallel and elongated. The array of wires 16 can include a very large number of wires, such as for example $>10^3$, $>10^4$, or $>10^6$.

Each of the wires 16 can include a stack of layers comprising the following layers in the following order: a first transparent layer 11 located closest to the transparent substrate 17; a second transparent layer 12; a reflective layer 15; a third transparent layer 13; and a fourth transparent layer 14 located farthest from the transparent substrate 17.

For each wire 16, each layer 11-15 in the stack of layers can be aligned with a plane $16_p$ that is perpendicular to the first side $17_f$ of the transparent substrate 17 and parallel to a length L of the wires 16. In other words, for each wire 16, a single plane $16_p$ that is perpendicular to the first side $17_f$ of the transparent substrate 17 can pass through all layers 11-15 in the stack of layers. Also, sides $16_s$ of each wire can be parallel to the plane $16_p$.

The channels 18 can be filled with air, glass, another solid material, a liquid, or vacuum. If the channels 18 are filled with a solid material, such solid material can have a material composition that is different from a material composition of the first transparent layer 11, the second transparent layer 12; the reflective layer 15; the third transparent layer 13; the fourth transparent layer 14; or combinations thereof. Each channel 18 can extend between all layers of the stack of layers; i.e. from a face of the fourth transparent layer 14 (or from a face of the eighth transparent layer 38 described below) farthest from the transparent substrate 17 to the transparent substrate 17.

The first transparent layer 11 can adjoin (i.e. directly contact) the transparent substrate 17 and/or the second transparent layer 12; alternatively, there can be other layer(s) between the first transparent layer 11 and the transparent substrate 17 and/or the second transparent layer 12. The reflective layer 15 can adjoin the third transparent layer 13 and/or the second transparent layer 12; alternatively, there can be other layer(s) between the reflective layer 15 and the third transparent layer 13 and/or the second transparent layer 12. The fourth transparent layer 14 can adjoin the third transparent layer 13 or there can be other layer(s) between the fourth transparent layer 14 and the third transparent layer 13.

Although the materials of the transparent layers 11-14 are transparent (see definitions section), when combined with the reflective layer 15 in the stack of layers, they can enhance reflection of one polarization (e.g. s-polarization) of the reflective layer 15. Materials (e.g. usually metals for visible light) for the reflective layer 15 and materials (e.g. dielectrics) of the transparent layers 11-14 and 35-38 (described below) are described in U.S. Pat. No. 7,961,393 and U.S. Pat. No. 8,755,113, which are incorporated herein by reference.

Following are specific embodiments of the above WGP 10, including specific values of reflection of one polarization and a relationship between the indices of refraction of the transparent layers 11-14. The reflection of one polarization and the index of refraction can vary with wavelength of incident light. Specified values can be valid for a specific wavelength range of light, such as for example a wavelength range of at least 100 nm or at least 200 nm in the ultraviolet, visible, or infrared spectrums of light, or across one or more of the ultraviolet, visible, and infrared spectrums of light.

One polarization state (e.g. p-polarization) can primarily transmit through the WGP 10 and an opposite polarization state (e.g. s-polarization) can primarily reflect off of the WGP 10. By proper design of this stack of layers, the WGP 10 can have (a) a high reflection of one polarization of light (e.g. high reflection of s-polarized light and thus high Rs1) for light incident on a first side $10_f$ of the WGP 10; and (b) a high reflection of one polarization of light (e.g. high reflection of s-polarized light and thus high Rs2) for light incident on a second side $10_s$ of the WGP 10. The first side $10_f$ of the WGP 10 can be a side of the WGP 10 on which the array of wires 16 is located. The second side $10_s$ of the WGP 10 can be opposite of the first side $10_f$ of the WGP 10 and can be a side of the WGP 10 on which the transparent substrate 17 is located. Thus, WGP 10 can be an effective polarizing beam splitter for light incident on both sides $10_f$ and $10_s$. For example, Rs1 and/or Rs2 can be greater than 92% in one aspect, greater than 93% in another aspect, greater than 95% in another aspect, or greater than 97% in another aspect.

To improve Rs1 and Rs2, there can be the following relationship between the indices of refraction of the transparent layers 11-14. An index of refraction of the first transparent layer (n1) can be greater than an index of refraction of the second transparent layer (n2) and/or an index of refraction of the fourth transparent layer (n4) can be greater than an index of refraction of the third transparent layer (n3). For example, there can be one or more of the following differences between the indices: n1−n2>0.1, n1−n2>0.2, n1−n2>0.5, n1−n2>1; n4−n3>0.1, n4−n3>0.2, n4−n3>0.5, n4−n3>1; |n1−n4|<0.2, |n1−n4|<0.1; |n2−n3|<0.2, |n2−n3|<0.1.

To improve Rs1 and Rs2, it can be beneficial for n1 and n4 to have high indices of refraction and for n2 and n3 to have low indices of refraction. For example, the indices of refraction can have one or more of the following values: n1>2.0, n1>1.65, n4>2.0, n4>1.65, n2<1.55, n3<1.55.

Figure 3:
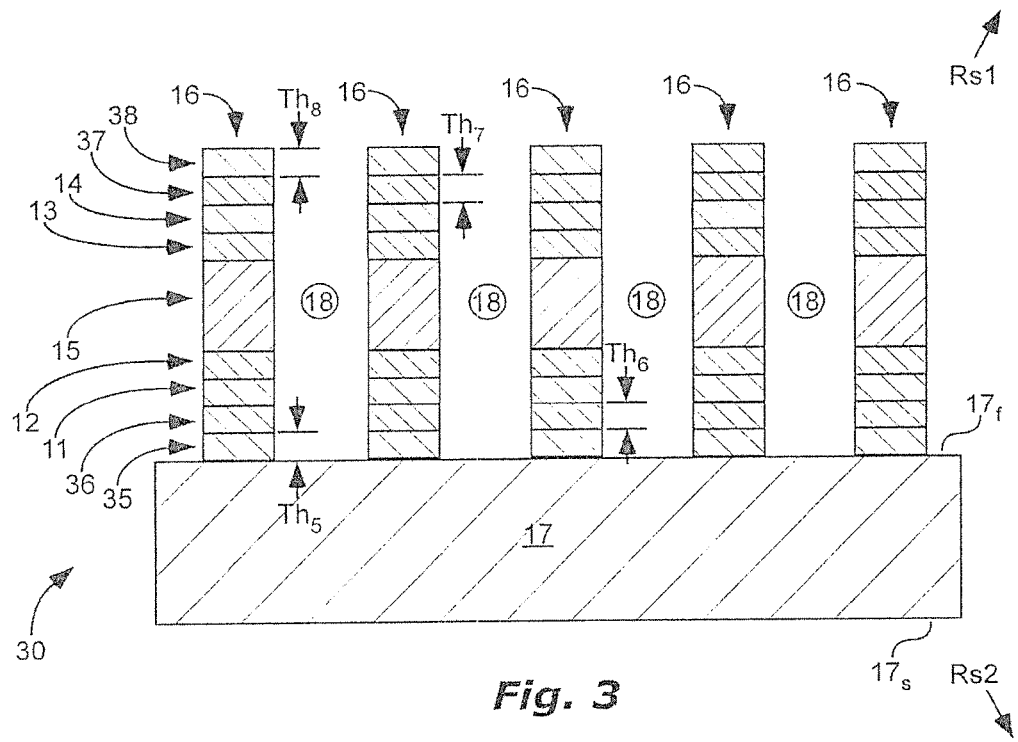
FIG. 3 is a schematic, cross-sectional side-view of a WGP 30, similar to WGP 10, but further comprising additional transparent layers 35-38, in accordance with an embodiment of the present invention.

WGP 30, shown in FIG. 3, can have characteristics of WGP 10 described above, and also the following characteristics. WGP 30 can have improved Rs1 and Rs2 by including additional pairs of layers with alternating high and low index of refraction. For example, WGP 30 can have wires 16 which include the following stack of layers in the following order: a fifth transparent layer 35 with an index of refraction n5, located closest to the transparent substrate 17; a sixth transparent layer 36 with an index of refraction n6; the first transparent layer 11; the second transparent layer 12; the reflective layer 15; the third transparent layer 13; the fourth transparent layer 14; a seventh transparent layer 37 with an index of refraction n7; and an eighth transparent layer 38 with an index of refraction n8, located farthest from the transparent substrate 17.

Following are possible relationships between and values of the indices of refraction of these additional layers 35, 36, 37, 38: n5>n6; n8>n7; n5−n6>0.1, n5−n6>0.2, n5−n6>0.5, n5−n6>1; n8−n7>0.1, n8−n7>0.2, n8−n7>0.5, n8−n7>1; |n5−n8|<0.2, |n5−n8|<0.1; |n6−n7|<0.2, |n6−n7|<0.1; n5>2.0, n5>1.65, n8>2.0, n8>1.65, n6<1.55, n7<1.55. The reflection of one polarization and the index of refraction can vary with wavelength of incident light. Specified values can be valid for a specific wavelength range of light, such as for example a wavelength range of at least 100 nm or at least 200 nm in the ultraviolet, visible, or infrared spectrums of light, or across one or more of the ultraviolet, visible, and infrared spectrums of light.

There can be additional pairs of high and low index of refraction layers in the stack of layers beyond those shown, and these additional layers can have similar relationships between the indices of refraction. Although WGP 30 may have improved performance over WGP 10, the added layers 35-38 can increase manufacturing cost. Therefore, a choice between WGP 10 and WGP 30 can be based on cost and needed performance.

Depending on the application, it can be beneficial to have a small difference between Rs1 and Rs2. For example: |Rs1−Rs2|<1% in one aspect, |Rs1−Rs2|<2% in another aspect, |Rs1−Rs2|<3% in another aspect, or |Rs1−Rs2|<5% in another aspect. One way to achieve this low difference between Rs1 and Rs2 is to have a mirror image of transparent materials on both sides of the reflective layer 15. Thus, a material composition of the first transparent layer 11 can be the same as a material composition of the fourth transparent layer 14. Also, a material composition of the second transparent layer 12 can be the same as a material composition of the third transparent layer 13, but different from the material composition of the first transparent layer 11 and the fourth transparent layer 14. For WGP 30, there can also be the same material composition of the fifth transparent layer 35 with the eighth transparent layer 38 and the sixth transparent layer 36 with the seventh transparent layer 37.

One example of material composition is that one or more of the first transparent layer 11, the fourth transparent layer 14, the fifth transparent layer 35, and the eighth transparent layer 38 can be or can include titanium dioxide. Another example of material composition is that one or more of the second transparent layer 12, the third transparent layer 13, the sixth transparent layer 36, and the seventh transparent layer 37 can be or can include silicon dioxide. Due to imperfections in deposition of materials of the transparent layers 11-14 and 35-38, these chemical formulas are not necessarily in exact stoichiometric ratios. For example, the term "titanium dioxide" means approximately one titanium atom for every two oxygen atoms, such as for example $Ti_xO_y$, where $0.9 \leq x \leq 1.1$ and $1.9 \leq y \leq 2.1$. As another example, silicon dioxide generally refers to $SiO_2$, but as used herein, the term silicon dioxide means approximately one silicon atom for every two oxygen atoms, such as for example $Si_vO_z$, where $0.9 \leq v \leq 1.1$ and $1.9 \leq z \leq 2.1$.

Figure 4:
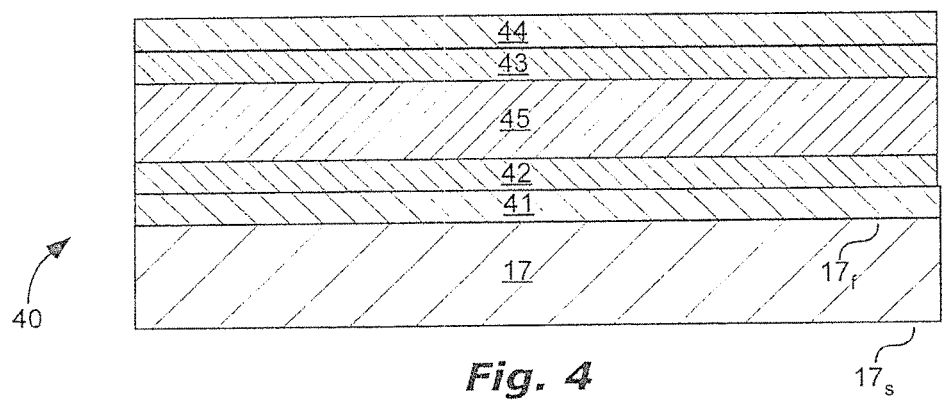
FIG. 4 is a schematic, cross-sectional side-view showing one step 40 in manufacture of a WGP 10, in accordance with an embodiment of the present invention.

Although materials of composition of the first transparent layer 11 and the fourth transparent layer 14 may be equal, and materials of composition of the second transparent layer 12 and the third transparent layer 13 may be equal, thicknesses of the equivalent layers may need to be different to equalize Rs1 and Rs2, because of potentially different materials at one end of the stack relative to an opposite end. For example, the first transparent layer 11 might be adjacent to glass and the fourth transparent layer 14 might be adjacent to air. The following method can be followed to achieve equal or nearly equal Rs1 and Rs2 even if there are different materials at one end of the stack (e.g. glass substrate) relative to an opposite end (e.g. air). The following method of manufacturing a WGP 10 can comprise the following steps in the following order:

1. calculating the following for equal reflection of one polarization of incident light (e.g. s-polarized light) on both the first side $10_f$ of the WGP 10 and on the second side $10_s$ of the WGP 10 (e.g. for Rs1=Rs2): a thickness of the first transparent layer 11, defining a first thickness $Th_1$; a thickness of the second transparent layer 12, defining a second thickness $Th_2$; a thickness of the third transparent layer 13, defining a third thickness $Th_3$; and a thickness of the fourth transparent layer 14, defining a fourth thickness $Th_4$;
2. depositing the following stack of thin films in the following order (see FIG. 4):
    a. material of the first transparent layer 41 with the first thickness $Th_1$;
    b. material of the second transparent layer 42 with the second thickness $Th_2$;
    c. material of the reflective layer 45;
    d. material of the third transparent layer 43 with the third thickness $Th_3$; and
    e. material of the fourth transparent layer 44 with the fourth thickness $Th_4$;
3. etching the stack of thin films to form the array of wires 16 (see FIG. 1).

Thicknesses of each layer $Th_1$, $Th_2$, $Th_3$, $Th_4$, $Th_5$, $Th_6$, $Th_7$, $Th_8$, and $Th_r$ in the stack of layers can be smaller than a smallest wavelength in a wavelength range of desired polarization, and each thickness can be less than 400 nm. Examples of thicknesses: $Th_2$ of the second layer 12, $Th_3$ of the third layer 13, $Th_6$ of the sixth layer 36, and $Th_7$ of the seventh layer 37 can be: =80 nm; >40 nm or >60 nm; and <110 nm or <150 nm. $Th_1$ of the first layer 11, $Th_4$ of the fourth layer 14, $Th_5$ of the fifth layer 35, and $Th_8$ of the eighth layer 38 can be: =50 nm; >10 nm or >30 nm; and <80 nm or <110 nm.

Figure 5:
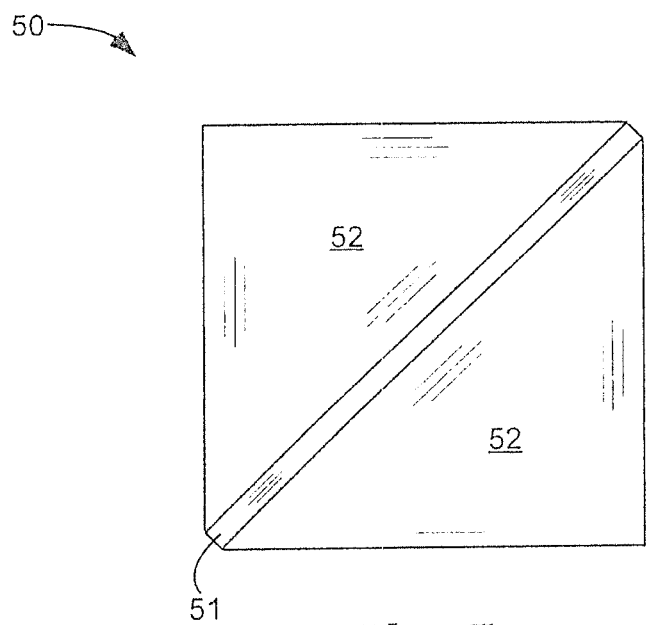
FIG. 5 is a schematic end-view of a cube polarizing beam splitter 50, including WGP 51, which can be WGP 10 or WGP 30, sandwiched between two prisms 52, in accordance with an embodiment of the present invention.

FIG. 5 is a schematic end-view of a cube polarizing beam splitter 50 including WGP 51, which can be WGP 10 or WGP 30, sandwiched between two prisms 52.

What is claimed is:

1. A wire grid polarizer (WGP) comprising:
a transparent substrate having a first side, and a second side opposite of the first side;
an array of wires located over the first side of the transparent substrate, with channels between adjacent wires;
each of the wires including a stack of layers comprising the following layers in the following order: a first transparent layer located closest to the transparent substrate, a second transparent layer, a reflective layer, a third transparent layer, and a fourth transparent layer located farthest from the transparent substrate; and
for a wavelength range of at least 100 nm in the visible spectrum of light, an index of refraction of the first transparent layer (n1) is greater than an index of refraction of the second transparent layer (n2) and an index of refraction of the fourth transparent layer (n4) is greater than an index of refraction of the third transparent layer (n3).

2. The WGP of claim 1, wherein for a wavelength range of at least 100 nm in a visible spectrum of light: n1−n2>0.5 and n4−n3>0.5.

3. The WGP of claim 1, wherein for a wavelength range of at least 100 nm in a visible spectrum of light: n1>2.0, n4>2.0, n2<1.55, and n3<1.55.

4. The WGP of claim 1, wherein a material composition of the second transparent layer is the same as a material composition of the third transparent layer.

5. The WGP of claim 4, wherein a material composition of the first transparent layer is the same as a material composition of the fourth transparent layer.

6. The WGP of claim 1, wherein a material composition of the first transparent layer is the same as a material composition of the fourth transparent layer.

7. The WGP of claim 1, wherein for a wavelength range of at least 100 nm in a visible spectrum of light, Rs1>93% and Rs2>93%, where Rs1 is a percent reflection of s-polarized light from a first side of the WGP; Rs2 is a percent reflection of s-polarized light from a second side of the WGP; s-polarized light is a predominantly reflected polarization of incident light; the first side of the WGP is a side of the WGP on which the array of wires is located; and the second side of the WGP is opposite of the first side of the WGP and is a side of the WGP on which the transparent substrate is located.

8. The WGP of claim 1, wherein the WGP is sandwiched between two prisms forming a cube polarizing beam splitter.

9. The WGP of claim 1, wherein:
the stack of layers further comprises a fifth transparent layer, a sixth transparent layer, a seventh transparent layer, and an eighth transparent layer;
the stack of layers includes the following layers in the following order: the fifth transparent layer located closest to the transparent substrate, the sixth transparent layer, the first transparent layer, the second transparent layer, the reflective layer, the third transparent layer, the fourth transparent layer, the seventh transparent layer, then the eighth transparent layer located farthest from the transparent substrate;
for a wavelength range of at least 100 nm in a visible spectrum of light, an index of refraction of the fifth transparent layer is greater than an index of refraction of the sixth transparent layer and an index of refraction of the eighth transparent layer is greater than an index of refraction of the seventh transparent layer.

10. A wire grid polarizer (WGP) comprising:
a transparent substrate having a first side, and a second side opposite of the first side;
an array of wires located over the first side of the transparent substrate, with channels between adjacent wires;
each of the wires including a stack of layers comprising the following layers in the following order: a first transparent layer located closest to the transparent substrate, a second transparent layer, a reflective layer, a third transparent layer, and a fourth transparent layer located farthest from the transparent substrate; and
for a wavelength range of at least 100 nm in a visible spectrum of light, Rs1>93% and Rs2>93%, where Rs1 is a percent reflection of s-polarized light from a first side of the WGP; Rs2 is a percent reflection of s-polarized light from a second side of the WGP; s-polarized light is a predominantly reflected polarization of incident light; the first side of the WGP is a side of the WGP on which the array of wires is located; and the second side of the WGP is opposite of the first side of the WGP and is a side of the WGP on which the transparent substrate is located.

11. The WGP of claim 10, wherein for the wavelength range of at least 100 nm in the visible spectrum of light an index of refraction of the first transparent layer is greater than 2; an index of refraction of the second transparent layer is less than 1.55; an index of refraction of the third transparent layer is less than 1.55; and an index of refraction of the fourth transparent layer is greater than 2.0.

12. The WGP of claim 10, wherein for the wavelength range of at least 100 nm in the visible spectrum of light, Rs1 and Rs2 are both greater than 95%.

13. The WGP of claim 10, wherein for the wavelength range of at least 100 nm in the visible spectrum of light: |Rs1−Rs2|<2%.

14. The WGP of claim 10, wherein the WGP is sandwiched between two prisms forming a cube polarizing beam splitter.

15. The WGP of claim 10, wherein the first transparent layer 11 adjoins the second transparent layer 12, the reflective layer 15 adjoins the third transparent layer 13 and the second transparent layer 12, and the fourth transparent layer 14 adjoins the third transparent layer 13.

16. The WGP of claim 10, wherein:
the stack of layers further comprises a fifth transparent layer, a sixth transparent layer, a seventh transparent layer, and an eighth transparent layer;
the stack of layers includes the following layers in the following order: the fifth transparent layer located closest to the transparent substrate, the sixth transparent layer, the first transparent layer 11, the second transparent layer, the reflective layer 15, the third transparent layer 13, the fourth transparent layer 14, the seventh transparent layer, then the eighth transparent layer located farthest from the transparent substrate;
for the wavelength range of at least 100 nm in the visible spectrum of light, an index of refraction of the fifth transparent layer is greater than an index of refraction of the sixth transparent layer and an index of refraction of the eighth transparent layer is greater than an index of refraction of the seventh transparent layer.

17. A wire grid polarizer (WGP) comprising:
a transparent substrate having a first side, and a second side opposite of the first side;
an array of wires located over the first side of the transparent substrate, with channels between adjacent wires;

each of the wires including a stack of layers comprising the following layers in the following order: a first transparent layer located closest to the transparent substrate, a second transparent layer, a reflective layer, a third transparent layer, and a fourth transparent layer located farthest from the transparent substrate; and for a wavelength range of at least 100 nm in an ultraviolet, visible, or infrared spectrums of light, an index of refraction of the first transparent layer (n1) is greater than an index of refraction of the second transparent layer (n2) and an index of refraction of the fourth transparent layer (n4) is greater than an index of refraction of the third transparent layer (n3).

18. The WGP of claim 17, wherein n1>n2 and n4>n3 for a wavelength range of at least 200 nm in the ultraviolet, visible, or infrared spectrums of light.

19. The WGP of claim 17, wherein n1>n2 and n4>n3 across the visible spectrum of light.

20. The WGP of claim 17, wherein n1>n2 and n4>n3 across the ultraviolet spectrum of light.

\* \* \* \* \*